United States Patent
Schmidt

(10) Patent No.: US 10,680,723 B1
(45) Date of Patent: Jun. 9, 2020

(54) MEASURING DEVICE AND METHOD WITH EFFICIENT CHANNEL SIMULATION

(71) Applicant: Rohde & Schwarz GmbH & Co. KG, Munich (DE)

(72) Inventor: Stefan Schmidt, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/296,783

(22) Filed: Mar. 8, 2019

(51) Int. Cl.
*H04B 3/46* (2015.01)
*H04B 17/00* (2015.01)
*H04B 17/364* (2015.01)
*H04B 17/391* (2015.01)

(52) U.S. Cl.
CPC ....... *H04B 17/0087* (2013.01); *H04B 17/364* (2015.01); *H04B 17/3912* (2015.01)

(58) Field of Classification Search
CPC ................ H04L 1/20; H04L 1/24; H04B 3/46
USPC .................................. 375/224; 714/741, 758
See application file for complete search history.

(56) References Cited

U.S. PATENT DOCUMENTS

| | | | | |
|---|---|---|---|---|
| 6,061,394 A | * | 5/2000 | Itahara | H04B 17/0087 375/227 |
| 7,593,459 B1 | * | 9/2009 | Venkatesh | H04L 25/06 375/220 |
| 7,852,912 B2 | | 12/2010 | Woodward et al. | |
| 2004/0088628 A1 | * | 5/2004 | Poutanen | H04B 17/0087 714/741 |
| 2006/0094365 A1 | * | 5/2006 | Inogai | H04B 17/0087 455/67.11 |
| 2016/0072595 A1 | * | 3/2016 | Schmidt | H04B 17/0085 375/224 |
| 2016/0353289 A1 | * | 12/2016 | Joung | H04W 16/22 |
| 2016/0373196 A1 | * | 12/2016 | Stott | H04B 17/336 |
| 2018/0343073 A1 | * | 11/2018 | Hinton | H04B 17/364 |

FOREIGN PATENT DOCUMENTS

DE  102009049415 A1  4/2010

OTHER PUBLICATIONS

Spirent Communications, "Channel Modelling for RAN4 RRM and Demodulation Testing", Berlin, Germany, Aug. 21-25, 2017, 4 pages.
Silva et al., "Conversion of reference tapped delay line channel models to discrete time channel models", Published in: 2003 IEEE 58th Vehicular Technology Conference. VTC 2003-Fall (IEEE Cat. No. 03CH37484), Oct. 6, 2003,5 pages.
"3rd Generation Partnership Project; Technical Specification Group Radio Access Network;Study on channel model for frequencies from 0.5 to 100 GHz (Release 14)", published in 3GPP TR 38.901 V14.3.0 (Dec. 2017), 91 pages.

* cited by examiner

*Primary Examiner* — Khai Tran
(74) *Attorney, Agent, or Firm* — Ditthavong & Steiner P.C.

(57) ABSTRACT

A measuring device comprising a channel simulator is provided. The channel simulator is adapted to simulate multipath propagation by modifying a first measuring signal, using a plurality of taps defined by tap parameters, resulting in a second measuring signal. The measuring device moreover comprises a parameter modifier, adapted to modify input tap parameters, resulting in the tap parameters.

18 Claims, 6 Drawing Sheets

MEASURING DEVICE AND METHOD WITH EFFICIENT CHANNEL SIMULATION

FIELD OF THE INVENTION

The invention relates to simulating a transmission channel in high frequency communications systems.

In mobile radio standards such as LTE, GSM, WCDMA etc. or NR (New Radio) (5G), performance requirements for BS (base station) and UEs (user equipment) are defined under certain channel conditions.

BACKGROUND OF THE INVENTION

Thus, there is a high demand from both UE and BS vendors for channel simulators. Channel simulators are available as independent devices that can be integrated into the test setup or they can be part of the test device as independent hardware resource.

For NR, a generic channel model has been defined. The defined tap delays have a time resolution of pico seconds [ps]. Simulating the delays with a time resolution of pico seconds results in very high demands on the channel simulator.

For example, the U.S. Pat. No. 7,852,912 B2 shows an equalizer system with conventional channel simulator.

Accordingly, there is a need to provide a measuring device and measuring method, which allow a simulation of propagation channels with a reduced hardware requirement.

SUMMARY OF THE INVENTION

According to a first aspect of the invention, a measuring device comprising a channel simulator is provided. The channel simulator is adapted to simulate multipath propagation by modifying a first measuring signal, using a plurality of taps defined by tap parameters, resulting in a second measuring signal. The measuring device moreover comprises a parameter modifier, adapted to modify input tap parameters, resulting in the tap parameters. By accordingly modifying the input tap parameters, it is possible to build the measuring device using simpler hardware components.

Preferably, the parameter modifier is adapted to modify the input tap parameters by rounding tap delay values and/or by combining taps, resulting in the tap parameters. By use of these two measures, the time resolution, on which the measuring device needs to operate, is significantly reduced, which allows a significant reduction in hardware complexity.

Further advantageously, the measuring device additionally comprises a signal generator, adapted to generate the first measuring signal, or a signal interface, adapted to receive the first measuring signal. The measuring device is moreover optionally adapted to provide the second measuring signal to a device under test. This allows for performing the entire signal generation and channel simulation within the measuring device or alternatively for very flexibly receiving the first measuring signal from an external source. This increases the hardware flexibility, significantly.

Further advantageously, the parameter modifier is adapted to modify the input tap parameters by rounding tap delay values and/or by combining taps, taking a capability of the device under test defined by a capability parameter into account, resulting in the tap parameters. It is no use to provide the second measuring signal with an accuracy that is higher than the accuracy of the device under test. Therefore, by taking the capability parameter of the device under test into account, it is possible to significantly reduce the hardware effort for generating the second measuring signal.

Advantageously, the measuring device further comprises a parameter storage, adapted to store the capability parameter of the device under test. The parameter modifier is then adapted to read the capability parameter of the device under test from the parameter storage. It is thereby assured that for a plurality of different devices under test, a correct signal generating accuracy is chosen.

Advantageously, the capability parameter of the device under test is a minimal time difference of events in a reception signal, the device under test can process. This minimal time difference corresponds to the time-resolution of the device under test. By using this capability parameter of the device under test, the time-resolution of performing the channel simulation can be set accordingly, which significantly reduces the effort for performing the channel simulation.

Advantageously, the parameter modifier is adapted to round tap delay values of the input tap parameters to natural number multiples of the minimal time difference of events in a reception signal, the device under test can process. Thereby, it is assured that the maximum testing resolution, which can be achieved with the present device under test, is actually achieved.

Further advantageously, if the rounding results in at least two taps having an identical rounded tap delay value, the parameter modifier is adapted to combine the at least two taps of identical rounded tap delay value. This further reduces the necessary hardware effort.

Advantageously, the channel simulator comprises a plurality of taps. Each of the plurality of taps comprises a delay element, each adapted to delay the first measuring signal by a tap-specific tap delay value, resulting in a delayed first measuring signal, for each of the taps. Each of the taps moreover comprises a multiplier, which is adapted to multiply the delayed first measuring signal of the respective tap with a tap-specific scattering parameter signal, resulting in a tap output signal for each of the taps. The channel simulator moreover comprises an adder, which is adapted to add all tap output signals, resulting in the second measuring signal. A very simple generation of the second measuring signal is thereby achieved.

Advantageously, the parameter modifier is adapted to combine the at least two taps of identical delay values, by adding the respective powers of the at least two taps of identical delay values. By this simple measure, a further reduction in hardware effort is achieved.

Further advantageously, the measuring device comprises a baseband processing unit, configured to emulate a cell bandwidth and a subcarrier spacing for multipath propagation with respect to the device under test. In this context, the parameter modifier is adapted to modify the input tap parameters with respect to a delay resolution defined through a minimum signal processing sample rate corresponding to the cell bandwidth and the subcarrier spacing, resulting in the tap parameters. Therefore, by defining a delay resolution through the minimum sample rate of the processed signal the path delay resolution of the simulated channel is significantly reduced, which guarantees proper channel emulation and at the same time avoids the necessity for complex filtering and/or resampling for the generation of delays.

Advantageously, the parameter modifier is adapted to round tap delay values of the input tap parameters to natural number multiples of the delay resolution. Therefore, the system sample rate will be an integer multiplier of the minimum sample rate of the processed signal and the delays can be realized without the need for filtering and/or resampling. Consequently, the complexity of channel simulation is significantly reduced.

Advantageously, the parameter storage is adapted to store the cell bandwidth, the subcarrier spacing and the delay resolution. In addition, the parameter modifier is adapted to read the cell bandwidth, the subcarrier spacing and the delay resolution from the parameter storage. Thereby, for a plurality of different devices under test, the previously emulated parameters can be utilized for a similar measurement setup, which leads to a further reduction in hardware effort.

According to a second aspect of the invention, a measuring method for simulating a transmission of a first measuring signal through a transmission channel, resulting in a second measuring signal is provided. The method comprises receiving input tap parameters, modifying the input tap parameters, resulting in tap parameters, and simulating multipath propagation by modifying the first measuring signal, using a plurality of taps defined by the tap parameters, resulting in the second measuring signal. This significantly reduces the hardware requirements for performing the measurements.

BRIEF DESCRIPTION OF THE DRAWINGS

An exemplary embodiment of the invention is now further explained by way of example only with respect to the drawings, in which.

DETAILED DESCRIPTION OF PREFERRED EMBODIMENTS

Figure 1:
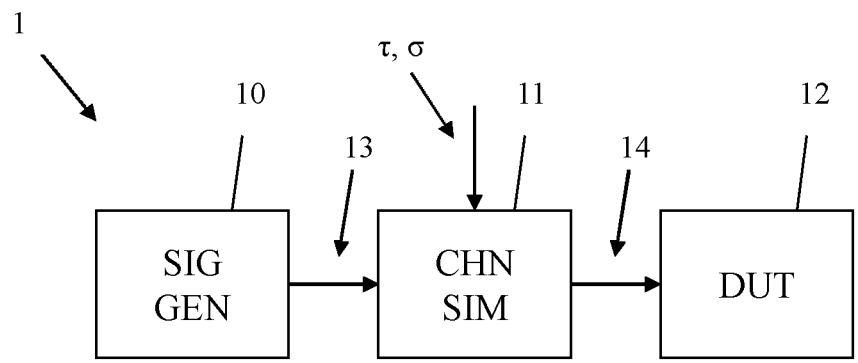
FIG. 1 shows an exemplary measuring device.
Figure 2:
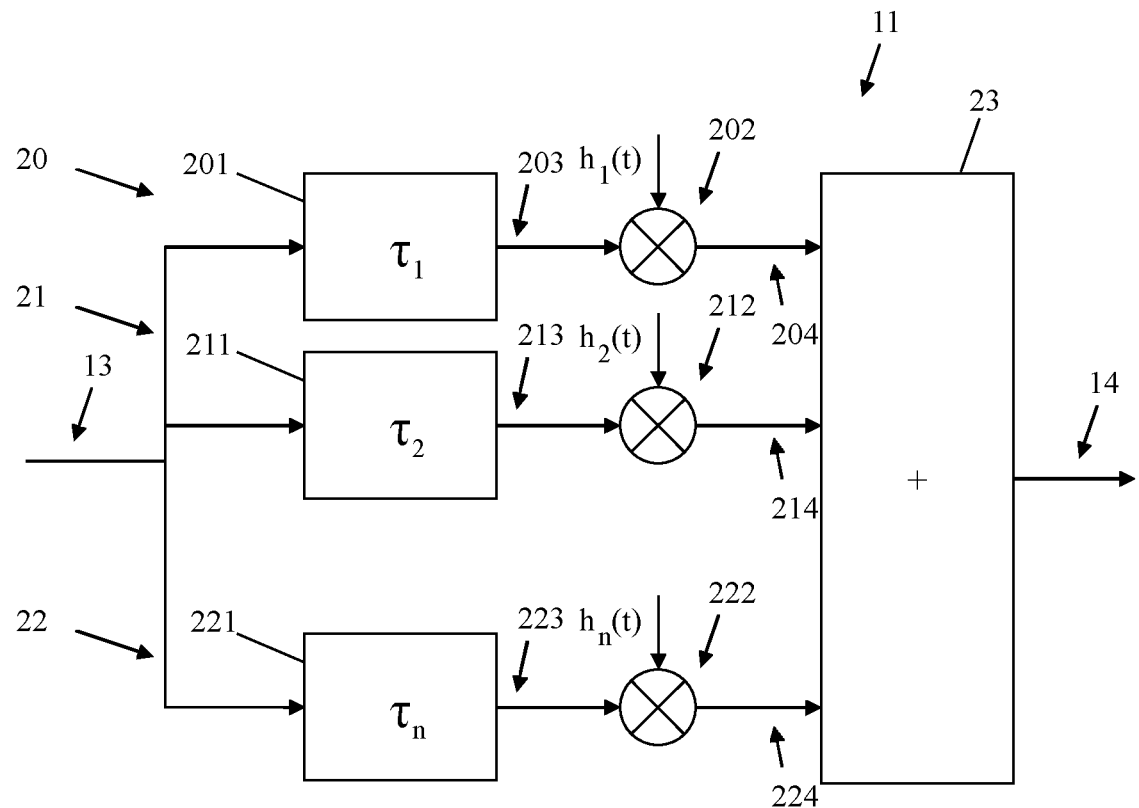
FIG. 2 shows an exemplary channel simulator.

First, we demonstrate the general function of a measuring device including a channel simulator along FIG. 1 and FIG. 2. With regard to FIG. 3, the function of a first embodiment of the inventive measuring device is shown in detail. With respect to FIG. 4, the function of a second embodiment of the inventive measuring device is shown in detail. Further respect to FIGS. 5-6, the rounding and combining of tap delay values as performed by the inventive measuring device are illustrated. Along FIG. 6, finally, the function of an embodiment of the inventive measuring method is described. Similar entities and reference numbers in different figures have been partially omitted.

In FIG. 1, a typical measuring device 1 is shown. The measuring device 1 here comprises a signal generator 10, which is connected to a channel simulator 11. The channel simulator 11 is connected to a device under test 12, which is not part of the measuring device 1.

The signal generator 10 generates a first measuring signal 13 and provides it to the channel simulator 11. The channel simulator 11 simulates a multipath propagation of the first measuring signal 13, resulting in a second measuring signal 14, which is provided to the device under test 12. The channel simulator 11 uses tap parameters $\tau$, $\sigma$ as inputs for defining the multipath propagation. While $\tau$ is the delay of a single tap, $\sigma$ is the square root of its power. It is important to note that the tap parameters in general comprise different values of $\tau$ and $\sigma$ for each of the taps of the simulated multipath propagation.

Details of the channel simulator 11 are shown in FIG. 2. The channel simulator 11 comprises a plurality of taps 20, 21, 22. Each of the taps comprises a delay element 201, 211, 221 and a multiplier 202, 212, 222. The inputs of the delay elements 201, 211 and 221 are connected to the signal generator 10. The outputs of the delay elements 201, 211 and 221 are connected to inputs of the multipliers 202, 212 and 222. Outputs of the multipliers 202, 212 and 222 are connected to a single adder 23, which is connected to the device under test 12.

For performing a channel simulation, the first measuring signal 13 is provided to the delay elements 201, 211 and 221. Each of the delay elements 201, 211, 221 delays the first measuring signal 13 by its respective delay value $\tau_1$, $\tau_2$, $\tau_n$, resulting in delayed first measuring signals 203, 213, 223, which are provided to the multipliers 202, 212 and 222. Each multiplier 202, 212, 222 multiplies the respective delayed first measuring signal 203, 213, 223 with a scattering parameter signal $h_1(t)$, $h_2(t)$, $h_n(t)$, resulting in a tap output signal 204, 214, 224 for each of the taps 20, 21, 22. The scattering parameter signals $h_1(t)$, $h_2(t)$, $h_n(t)$ are generated in the channel simulator 11 as a function of the tap parameters $\tau$, $\sigma$. The tap output signals 204, 214, 224 are added up by the adder 23, resulting in the second measuring signal 14.

In a conventional channel simulator, used in a conventional measuring device or separately, the tap parameters $\tau$, $\sigma$ are set according to a specified communications standard. This results in very high hardware requirements imposed on the channel simulator. In many practical cases, this high hardware effort though is not necessary, since the device under test does not have a time resolution necessitating such accurate measuring signal generation. Therefore, it is not necessary that a channel simulator generates delays with a time resolution that is higher than that of the UE.

Figure 3:
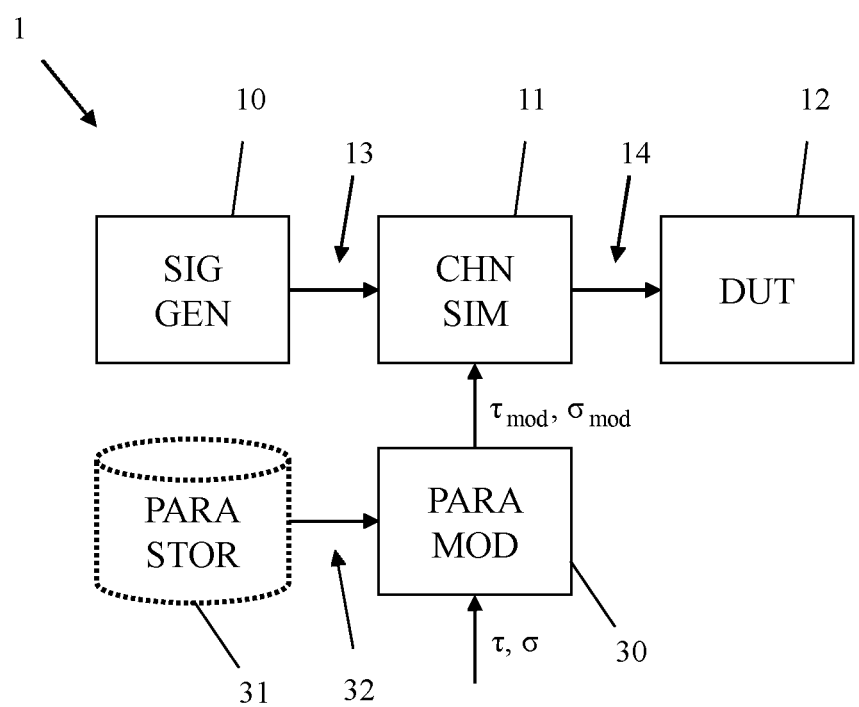
FIG. 3 shows a first embodiment of the inventive measuring device.

In FIG. 3, a channel simulator according to a first embodiment of the present invention that simulates the tap delays as multiples of the time resolution $\Delta T$ is shown. In this context, the time resolution $\Delta T$ of the UE is given through its signal processing bandwidth BW, i.e.

$$\Delta T = \frac{1}{BW}$$

The measuring device 1 as shown in FIG. 3, comprises a signal generator 10, connected to a channel simulator 11. Moreover, the measuring device comprises a parameter modifier 30, which is also connected to the channel simulator 11. The measuring device moreover comprises, as an optional component, a parameter storage 31, which is also connected to the parameter modifier 30. As already shown in FIG. 1, also here, the channel simulator 11 is connected to a device under test 12, which is not part of the measuring device 1.

When performing a measurement, the parameter modifier 30 receives input tap parameters $\tau$, $\sigma$ and modifies them to generate tap parameters $\tau_{mod}$, $\sigma_{mod}$. These tap parameters $\tau_{mod}$, $\sigma_{mod}$ are provided to the channel simulator 11. The signal generator 10 generates a first measuring signal 13, which is provided to the channel simulator 11. The channel simulator 11 now uses the tap parameters $\tau_{mod}$, $\sigma_{mod}$ for generating scattering parameter signals $h_1(t)$, $h_2(t)$, $h_n(t)$ to perform the channel simulation, as shown along FIG. 2. It is important to note that the tap parameters $\tau_{mod}$, $\sigma_{mod}$ require lower hardware effort than the input tap parameters $\tau$, $\sigma$.

Figure 4:
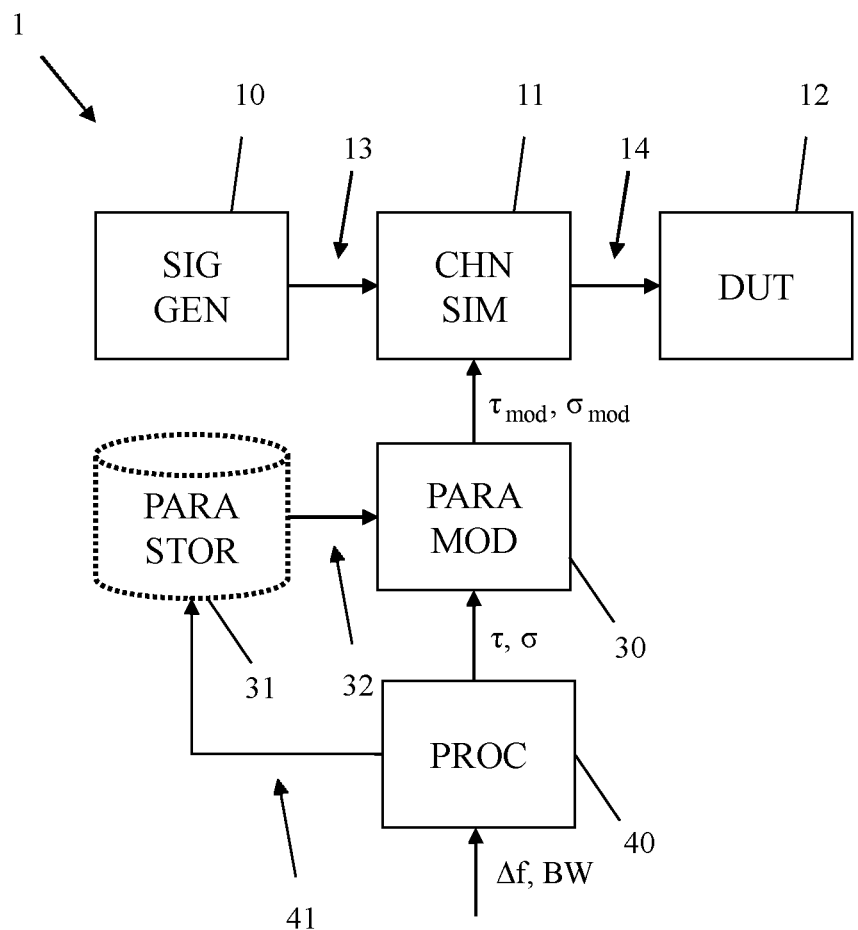
FIG. 4 shows a second embodiment of the inventive measuring device.

In FIG. 4, a channel simulator according to a second embodiment of the present invention that simulates the tap delays as multiples of a delay resolution is shown. In this context, the measuring device 1 as shown in FIG. 4, comprises a signal generator 10, connected to a channel simulator 11. Furthermore, the measuring device comprises a parameter modifier 30, which is also connected to the channel simulator 11. Moreover, the measuring device comprises, as an optional component, a parameter storage 31, which is also connected to the parameter modifier 30. The measuring device further comprises a baseband processing unit 40, which is connected to the parameter modifier 30 and to the parameter storage 31. As already shown in FIG. 1, also here, the channel simulator 11 is connected to a device under test 12, which is not part of the measuring device 1.

When performing a measurement, the parameter modifier 30 receives input tap parameters $\tau$, $\sigma$ through the baseband processing unit and modifies them to generate tap parameters $\tau_{mod}$, $\sigma_{mod}$ with respect to a minimum signal processing sample rate defined by the baseband processing unit 40. It is advantageous that the parameters emulated by the baseband processing unit 40 are stored in the parameter storage 31, since these parameters can be utilized as often as required for a similar measurement setup when measuring with respect to a plurality of device under test 12. These tap parameters $\tau_{mod}$, $\sigma_{mod}$ are provided to the channel simulator 11. The signal generator 10 generates a first measuring signal 13, which is provided to the channel simulator 11. The channel simulator 11 now uses the tap parameters $\tau_{mod}$, $\sigma_{mod}$ for generating scattering parameter signals $h_1(t)$, $h_2(t)$, $h_n(t)$ to perform the channel simulation, as shown along FIG. 2.

The baseband processing unit 40 preferably emulates a cell bandwidth BW and a subcarrier spacing $\Delta f$ for the simulated channel with respect to the device under test 12. Herein the required minimum Fast Fourier Transformation (FFT) length is determined as:

$$N_{FFT,native} = 2^{\min\{m \in \mathbb{N} | 2^m \geq \frac{BW}{\Delta f}\}}$$

where, $\mathbb{N}$ denotes the natural numbers.

The subcarrier spacing $\Delta f$ and the minimum FFT length $N_{FFT,native}$ lead to the minimum system sample rate as:

$$f_{s,native} = N_{FFT,native} * \Delta f$$

In this context, the system FFT length and the system sample rate is obtained by means of the following equations:

$$N_{FFT,actual} = N_{FFT,native} * 2^m$$

and $$f_{s,actual} = f_{s,native} * 2^m$$

with $m \in \mathbb{N}_0$
where $\mathbb{N}_0$ denotes the natural numbers including 0.

In the following, some details of how the modification of the input tap parameters $\tau$, $\sigma$ in order to achieve the tap parameters $\tau_{mod}$, $\sigma_{mod}$, is shown:

Channel Impulse Response

A channel simulator simulates the channel impulse response.

A time variant channel impulse response $h(\tau,t)$ with $N_{tap}$ taps can be written as:

$$h(\tau, t) = \sum_{k=1}^{N_{tap}} \sigma_k(t) * x_k(t) * \delta(\tau - \tau_k(t))$$

where $$\delta(t) = \begin{cases} 1, & t = 0 \\ 0, & t \neq 0 \end{cases}$$

is the delta function and $\sigma_k^2(t)$ and $\tau_k(t)$ are the variance and the delay of tap k respectively.
$x_k(t)$ is without loss of generality a complex function of time t with unit variance, i.e.

$$\text{var}(x_k(t)) = E(x_k(t) * x_k^*(t)) = 1$$

where E( ) is the expectation operator.

In most applications $\sigma_k(t)$ and $\tau_k(t)$ do not vary in time. Then we have $$h(\tau, t) = \sum_{k=1}^{N_{tap}} \sigma_k * x_k(t) * \delta(\tau - \tau_k)$$

Rounding the Delays

Taps that are closer in time than the time resolution cannot be distinguished from the UE. Thus it is sufficient to simulate each tap with a delay that lies on the delay grid given as:

$$n * \Delta T = \frac{n}{BW}$$

according to the first embodiment and $$n * \Delta T = \frac{n}{f_{s,native}}$$

the second embodiment with $n \in \mathbb{N}_0$
where $\mathbb{N}_0$ denotes the natural numbers including 0.

If a test specification defines a delay for tap k, i.e. $\tau_k$, that does not lie on the delay grid, i.e.

$$\tau_k \neq n * \Delta T$$

then $\tau_k$ should be replaced with the closest delay $\tau'_k$ on the delay grid, i.e.
define $$n_k = \underset{n}{\arg\min} |n * \Delta T - \tau_k|$$

then $$\tau_{mod,k} = n_k * \Delta T$$

EXAMPLE

Assume that $\Delta T = 5$ ns and the test specification defines the following power delay profile:

TABLE 1

Power delay profile defined
from test specification

| Tap k | $\sigma_k$ | $\tau_k$ [ns] |
|---|---|---|
| 1 | $\sigma_1$ | 0 |
| 2 | $\sigma_2$ | 6 |
| 3 | $\sigma_3$ | 9 |
| 4 | $\sigma_4$ | 15 |

The power delay profile implemented in the channel simulator 11 would then be:

TABLE 2

Power delay profile implemented
from channel simulator

| Tap k | $\sigma_k$ | $\tau_{mod,k}$ [ns] |
|---|---|---|
| 1 | $\sigma_1$ | 0 |
| 2 | $\sigma_2$ | 5 |
| 3 | $\sigma_3$ | 10 |
| 4 | $\sigma_4$ | 15 |

Figure 5:
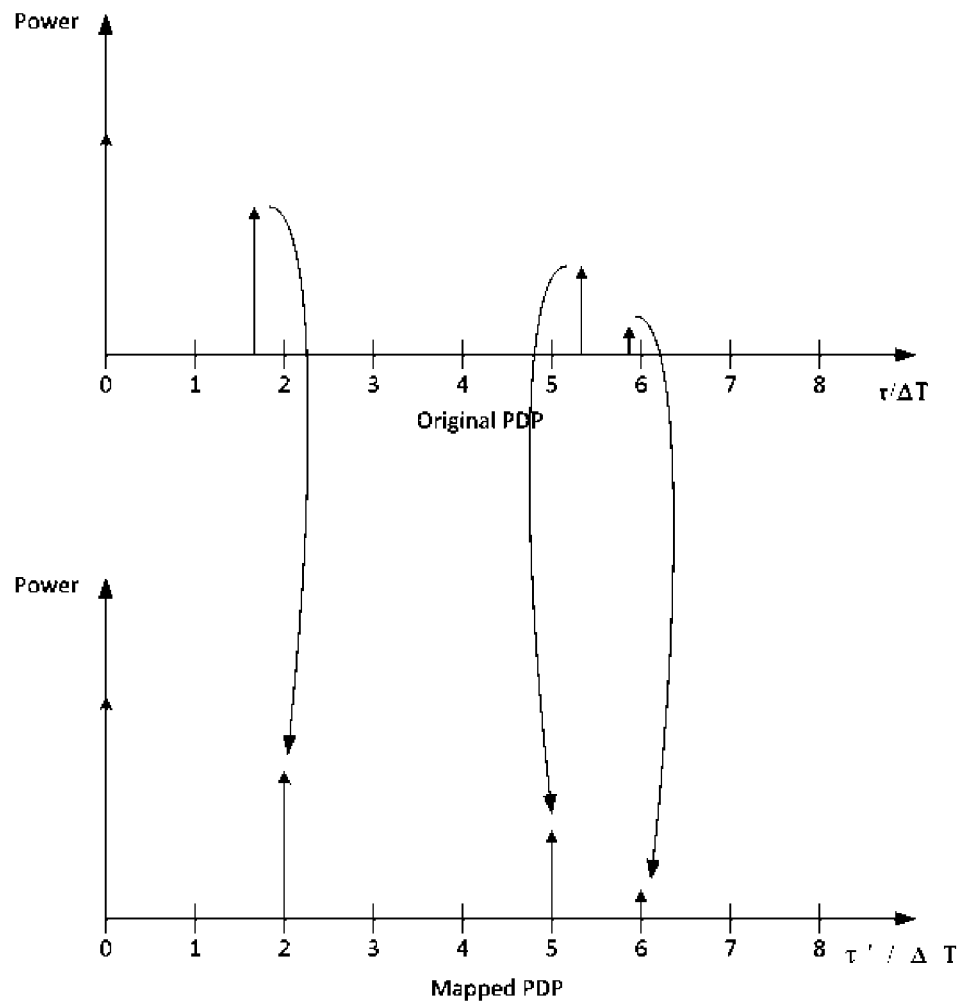
FIG. 5 shows a rounding of tap delay values as performed by the inventive measuring device.

Such a rounding of tap delay values is shown in FIG. 5. In the top part of FIG. 5, the original power delay profile of the channel simulation is shown. On the x-axis, the timing of the individual taps is shown, while on the y-axis, the respective power is depicted. Here, it can be seen that the timing of the individual taps does not lie on natural number multiples of the minimum time resolution $\Delta T$ of the device under test.

In the lower part of FIG. 5, the power delay profile after rounding is shown. It can clearly be seen that now the timing of all taps is set to a natural number multiples of the minimum time difference of events detectable by the device under test $\Delta T$.

Combination of Taps

If rounding is performed as shown before, it may happen that two or more taps fall onto the same delay. Those taps can then be combined to a single tap.

We will consider two examples here:
1. $x_k(t)$ is implemented as random process
2. $x_k(t)$ is implemented as a sum of sinusoids (SOS)

Random Process

Consider $x_k(t)$ being implemented as random process.

Assume that after rounding K taps falls onto the same delay. Without loss of generality we number them with $1 \leq k \leq K$, i.e.

$$\tau_{mod,1} = \tau_{mod,2} = \ldots = \tau_{mod,K} = \tau$$

Those K taps will then be combined to a single tap with power $\sigma^2$:

$$\sigma^2 = \sum_{k=1}^{K} \sigma_k^2$$

and delay $\tau$.

EXAMPLE

Assume that $\Delta T=5$ ns and the test specification defines the following power delay profile:

TABLE 3

Power delay profile defined
from test specification

| Tap k | $\sigma_k$ | $\tau_k$ [ns] |
|---|---|---|
| 1 | $\sigma_1$ | 0 |
| 2 | $\sigma_2$ | 4 |
| 3 | $\sigma_3$ | 5 |
| 4 | $\sigma_4$ | 6 |
| 5 | $\sigma_5$ | 10 |

After rounding of delays one obtains:

TABLE 4

Power delay profile after rounding of delays

| Tap k | $\sigma_k$ | $\tau_{mod,k}$ [ns] |
|---|---|---|
| 1 | $\sigma_1$ | 0 |
| 2 | $\sigma_2$ | 5 |
| 3 | $\sigma_3$ | 5 |
| 4 | $\sigma_4$ | 5 |
| 5 | $\sigma_5$ | 10 |

After combination of taps one obtains

TABLE

Power delay profile after combination of taps
and implemented in channel simulator

| Tap k | $\sigma_k$ | $\tau_k'$ [ns] |
|---|---|---|
| 1 | $\sigma_1$ | 0 |
| 2 | $\sqrt{\sigma_2^2+\sigma_3^2+\sigma_4^2}$ | 5 |
| 3 | $\sigma_5$ | 10 |

And thus the impulse response is given as:

$$h(\tau,t) = \sigma_1 * x_1(t) * \delta(\tau) + \sqrt{\sigma_2^2+\sigma_3^2+\sigma_4^2} * x_2(t) * \delta(\tau-5 \text{ ns}) + \sigma_5 * x_3(t) * \delta(\tau-10 \text{ ns})$$

where $x_1(t)$, $x_2(t)$ and $x_3(t)$ are independent random processes with unit variance.

Sum of Sinusoids

Consider $x_k(t)$ being implemented as sum of sinusoids (SOS), i.e.

$$x_k(t) = \sum_{i=1}^{N_k^{subpath}} a_{k,i} * \exp(j*2*\pi*f_{k,i}*t)$$

where $N_k^{subpath}$ number of subpaths (=sinusoids) of tap k, $a_{k,i}$ is the complex amplitude and $f_{k,i}$ is the frequency of subpath i and tap k, respectively.

Assume that after rounding K taps falls onto the same delay. Without loss of generality we number them with $1 \leq k \leq K$, i.e.

$$\tau'_1 = \tau'_2 = \ldots = \tau'_K = \tau$$

The original K taps, i.e.

$$\tau_k * x_k(t) * \delta(\tau-\tau_k) \text{ for } 1 \leq k \leq K$$

will then be combined to a single tap $$x(t) * \delta(\tau-\tau)$$

with $$x(t) = \sum_{k=1}^{K} \sigma_k * x_k(t) = \sum_{k=1}^{K} \sum_{i=1}^{N_k^{subpath}} \sigma_k * a_{k,i} * \exp(j*2*\pi*f_{k,i}*t)$$

Figure 6:
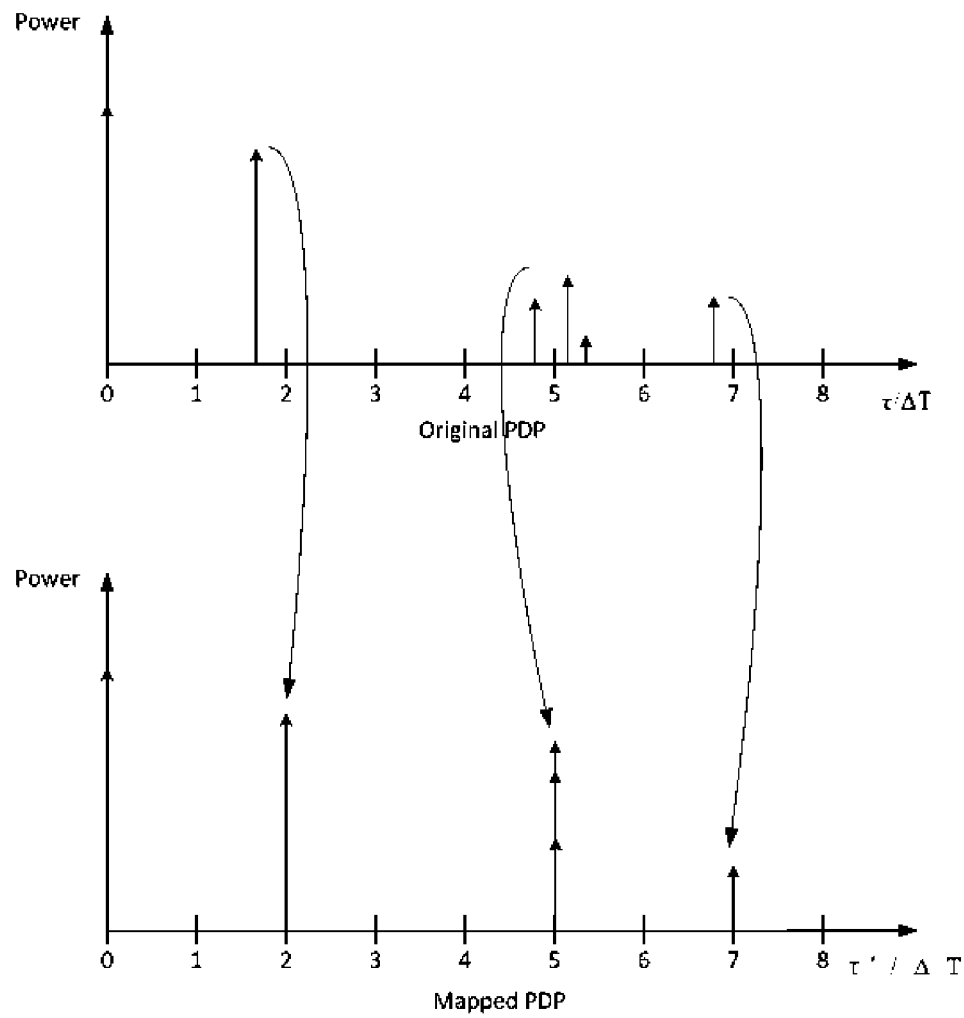
FIG. 6 shows combined taps as used by the inventive measuring device.

Such a combining of taps is shown in FIG. 6. While in the top part of FIG. 6, the original situation of the power delay profile before rounding and combining is shown. It can be seen that the tap with timing approximately 1.7 is rounded to a delay of 2. The taps with timings at 4.8, 5.1 and 5.3 are all rounded to a delay of 5 and combined into a single tap. The tap with a delay of 6.8 is rounded to a delay of 7.

Figure 7:
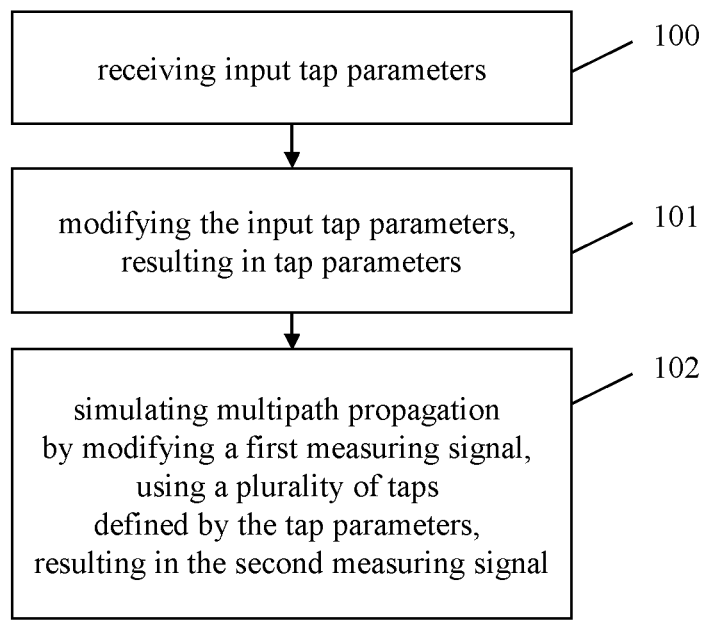
FIG. 7 shows an embodiment of the inventive measuring method, in a flow diagram.

Finally, in FIG. 7, an embodiment of the inventive measuring method is shown. In a first step 100 input tap parameters are received. In a second step 101, the input tap parameters are modified, so as to achieve the resulting tap parameters. In a final step 102, a multipath propagation is simulated by modifying a first measuring signal, using a plurality of taps, defined by the tap parameters, resulting in the second measuring signal.

The invention is not limited to the examples and especially not to a measuring device comprising a signal generator. The channel simulator can operate as a stand alone measuring device as well. The characteristics of the exemplary embodiments can be implemented in any advantageous combination of the features claimed in the claims, described in the description or drawn in the drawings.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A measuring device comprising:
a channel simulator, adapted to simulate multipath propagation by modifying a first measuring signal, using a plurality of taps defined by tap parameters, resulting in a second measuring signal;
a parameter modifier, adapted to modify input tap parameters, resulting in the tap parameters; and
a baseband processing unit, configured to emulate a cell bandwidth and a subcarrier spacing for multipath propagation with respect to a device under test.

2. The measuring device according to claim 1, wherein the parameter modifier is adapted to modify the input tap parameters by rounding tap delay values and/or by combining taps, resulting in the tap parameters.

3. The measuring device according to claim 1, wherein the measuring device further comprises a signal generator, adapted to generate the first measuring signal, or a signal interface, adapted to receive the first measuring signal, and/or
wherein the measuring device is adapted to provide the second measuring signal to the device under test.

4. The measuring device according to claim 3, wherein the parameter modifier is adapted to modify the input tap parameters by rounding tap delay values and/or by combining taps, taking a capability of the device under test defined by a capability parameter into account, resulting in the tap parameters.

5. The measuring device according to claim 4, wherein the measuring device further comprises a parameter storage, adapted to store the capability parameter of the device under test, and
wherein the parameter modifier is adapted to read the capability parameter of the device under test from the parameter storage.

6. The measuring device according to claim 4, wherein the capability parameter of the device under test is a minimal time difference of events in a reception signal, the device under test can process.

7. The measuring device according to claim 6, wherein the parameter modifier is adapted to round tap delay values of the input tap parameters to natural number multiples of the minimal time difference of events in a reception signal, the device under test can process.

8. The measuring device according to claim 7, wherein if the rounding results in at least two taps having an identical rounded tap delay value, the parameter modifier is adapted to combine the at least two taps of identical rounded tap delay value.

9. The measuring device according to claim 1, wherein the channel simulator comprises a plurality of taps,
wherein each of the plurality of taps comprises a delay element, each adapted to delay the first measuring signal by a tap-specific tap delay value, resulting in a delayed first measuring signal, for each of the taps,
wherein each of the taps comprises a multiplier, adapted to multiply the delayed first measuring signal of the respective tap with a tap-specific scattering parameter signal, resulting in a tap output signal for each of the taps, and
wherein the channel simulator comprises an adder, adapted to add all tap output signals, resulting in the second measuring signal.

10. The measuring device according to claim 9, wherein the parameter modifier is adapted to combine the at least two taps of identical rounded tap delay values, by adding the respective powers of the at least two taps of identical delay values.

11. The measuring device according to claim 5, wherein the parameter modifier is adapted to modify the input tap parameters with respect to a delay resolution defined through a minimum signal processing sample rate corresponding to the cell bandwidth and the subcarrier spacing, resulting in the tap parameters.

12. The measuring device according to claim 11, wherein the parameter modifier is adapted to round tap delay values of the input tap parameters to natural number multiples of the delay resolution.

13. The measuring device according to claim 11,
wherein the parameter storage is adapted to store the cell bandwidth, the subcarrier spacing and the delay resolution, and
wherein the parameter modifier is adapted to read the cell bandwidth, the subcarrier spacing and the delay resolution from the parameter storage.

14. A measuring method for simulating a transmission of a first measuring signal through a transmission channel, resulting in a second measuring signal, the method comprising steps of:
receiving input tap parameters;
modifying the input tap parameters, resulting in tap parameters;
simulating multipath propagation by modifying the first measuring signal, using a plurality of taps defined by the tap parameters, resulting in the second measuring signal; and
emulating a cell bandwidth and a subcarrier spacing for multipath propagation with respect to the device under test.

15. The measuring method according to claim 14,
wherein the method comprises modifying the input tap parameters by rounding tap delay values and/or by combining taps, resulting in the tap parameters.

16. The measuring method according to claim 15,
wherein the input tap parameters are modified by rounding tap delay values and/or by combining taps, taking a capability of a device under test, the second measuring signal is provided to, defined by a capability parameter, into account, resulting in the tap parameters.

17. The measuring method according to claim 14,
wherein the method further comprises modifying the input tap parameters with respect to a delay resolution defined through a minimum signal processing sample rate corresponding to the cell bandwidth and the subcarrier spacing, resulting in the tap parameters.

18. The measuring method according to claim 17,
wherein the method further comprises rounding tap delay values of the input tap parameters to natural number multiples of the delay resolution.

\* \* \* \* \*